United States Patent
Kim (10) Patent No.: US 8,909,289 B2
(45) Date of Patent: Dec. 9, 2014

(54) SYSTEM AND METHOD FOR PROVIDING A SMART CARD-BASED WIDGET SERVICE, AND SMART CARD FOR THE SAME

(75) Inventor: Seung Hwan Kim, Seongnam-si (KR)

(73) Assignee: SK Planet Co., Ltd., Seoul (KR)

( * ) Notice: Subject to any disclaimer, the term of this patent is extended or adjusted under 35 U.S.C. 154(b) by 658 days.

(21) Appl. No.: 13/132,255

(22) PCT Filed: Jul. 8, 2010

(86) PCT No.: PCT/KR2010/004438
§ 371 (c)(1),
(2), (4) Date: Jun. 1, 2011

(87) PCT Pub. No.: WO2011/071221
PCT Pub. Date: Jun. 16, 2011

(65) Prior Publication Data
US 2011/0263295 A1    Oct. 27, 2011

(30) Foreign Application Priority Data
Dec. 9, 2009 (KR) .................. 10-2009-0121752

(51) Int. Cl.
*H04B 1/38* (2006.01)
*G06F 9/44* (2006.01)

(52) U.S. Cl.
CPC ............ *G06F 8/38* (2013.01); *G06F 9/4443* (2013.01)
USPC .................. 455/558; 455/418; 455/419

(58) Field of Classification Search
USPC ........................ 455/558, 418, 419
See application file for complete search history.

(56) References Cited

U.S. PATENT DOCUMENTS

2006/0211450 A1*  9/2006  Niekerk et al. .............. 455/558
2008/0126937 A1*  5/2008  Pachet ......................... 715/720
2008/0195961 A1   8/2008  Bae et al.
(Continued)

FOREIGN PATENT DOCUMENTS

EP   1780993 A2   5/2007
EP   2175367 A2   4/2010
(Continued)

OTHER PUBLICATIONS

Notice of Allowance from KIPO mailed Oct. 29, 2012 for KR 10-2009-0121752.
(Continued)

*Primary Examiner* — Kwasi Karikari
(74) *Attorney, Agent, or Firm* — Lowe Hauptman & Ham, LLP (57) ABSTRACT

A system and method provide a smart card-based widget service, and a smart card for the same. Status information including information about a service icon and an active status for at least one widget service embedded according to the specification of a user is set. A widget waiting screen image including the service icon of the widget service set in the active status is made and provided to the user terminal. A widget service corresponding to a specific icon is executed according to the selection of the user for the specific icon so that an execution screen image of the executed widget service is provided. A widget service for a waiting screen image is provided regardless of the type and the specification of a user terminal for the smart card. Even if the user terminal is replaced with new one, information of the smart card is maintained.

14 Claims, 6 Drawing Sheets

(56) References Cited

U.S. PATENT DOCUMENTS

| | | |
|---|---|---|
| 2009/0103144 A1 | 4/2009 | Kim |
| 2010/0037230 A1* | 2/2010 | Potonniee et al. ............ 718/103 |
| 2010/0130254 A1* | 5/2010 | Kamada et al. ............... 455/558 |

FOREIGN PATENT DOCUMENTS

| | | |
|---|---|---|
| KR | 10-0861659 | 9/2008 |
| KR | 10-2008-0107868 | 12/2008 |
| KR | 1020090019177 | 2/2009 |
| KR | 10-2009-0077412 | 7/2009 |
| KR | 1020090069866 | 7/2009 |
| KR | 1020090107638 | 10/2009 |
| WO | 2009074188 A1 | 6/2009 |

OTHER PUBLICATIONS

International Search Report for PCT/KR2010/004438, dated Feb. 28, 2011.

Sung Moo Hong, User Research and User Centered Design; Designing, Developing, and Commercializing Widget Service on Mobile Handset, 8 pages, Human Centered Design.

Supplementary European Search Report for application No. 10835263.4-1957/2512035 dated Jul. 15, 2013.

Chinese Office Action for application No. 201080017335.4 dated Aug. 29, 2013.

\* cited by examiner

SYSTEM AND METHOD FOR PROVIDING A SMART CARD-BASED WIDGET SERVICE, AND SMART CARD FOR THE SAME

TECHNICAL FIELD

The present invention relates to a method for providing a widget service. More particularly, the present invention relates to a system and method for providing a smart card-based widget service, and a smart card for the same, capable of providing various widget services by mounting a widget engine based on a service platform embedded in the smart card and driving the widget engine.

BACKGROUND ART

With the advance of technology, a mobile communication terminal can support various functions such as the Internet, an SMS service, and a multimedia function as well as existing simple voice communication. Besides, as various services and additional functions, such as a multimedia service or a camera function, are increased, the screen of the mobile communication terminal is gradually enlarged, and the resolution of the screen is continuously increased. In addition, as the demands of users are diversified and subdivided incompatibly with the past, it is necessary to utilize the screen space of a mobile communication terminal in a more varied and effective way.

In this regard, rapid access schemes to an application in a mobile communication terminal have been suggested such that a user can easily and simply access an application representing high user preference. Among the access schemes, there has been suggested a technology to arrange at least one application in the form of a widget on one screen image on which a specific application is executed.

Meanwhile, conventionally, mobile service applications have existed on a software (S/W) platform in the mobile communication terminal. However, the mobile service applications can be provided in a USIM card as the capacity of a smart card is greatly increased and the interface with the smart card is highly increased.

Therefore, technologies to realize services in the large-capacity smart card as described above have been discussed. In detail, a scheme for a new interface between the mobile communication terminal and the smart card is required in order to provide a waiting screen image widget based on the smart card instead of an existing waiting screen image widget provided based on applications embedded in the mobile communication terminal.

DISCLOSURE

Technical Problem

Accordingly, the present invention has been made to solve the above-mentioned problems occurring in the prior art, and an object of the present invention is to provide a system and a method for providing a smart card-based widget service, and a smart card for the same. In this system, method, and smart card, a widget engine is mounted based on a service platform embedded in the smart card, so that related services can be realized. The list of installable widget services is searched through a user terminal having the smart card installed therein, so that new widget services can be installed. Existing widget services are removable from the smart card.

Technical Solution

In order to accomplish the above objects, there is provided a system for providing a smart card-based widget service including a user terminal receiving a widget waiting screen image. The widget waiting screen image includes a service icon for a widget service in an active status from among at least one widget service embedded in a smart card, from the smart card through an interface with the smart card and receiving an execution screen image for a widget service corresponding to a specific service icon as the specific service icon is selected from the widget waiting screen image, and the smart card setting status information including information about a service icon and an active status for the at least one widget service corresponding to specification of a user through the user terminal, making the widget waiting screen image including the service icon for the active-status widget service to provide the widget waiting screen image to the user terminal, and executing a widget service corresponding to a specific service icon as the specific service icon is selected from the user terminal to provide the execution screen image corresponding to the widget service to the user terminal.

In one aspect of the present invention, there is provided a user terminal including a card interworking module for forming an interface used to communicate with a smart card, connecting to the smart card through the interface to receive and send a widget waiting screen image including a service icon for an active-status widget service from among at least one widget service embedded in the smart card, a user interface module for requesting execution of a widget service corresponding to a specific service icon to the smart card through the interface as the specific service icon is selected from the widget waiting screen image sent from the card interworking module, receiving an execution screen image of the widget service from the smart card through the interface according to the execution requesting of the widget service, and displaying the execution screen image, and a server interface module for establishing a connection path with a remote server according to request of the smart card through the interface, transmitting status information, which includes information about a service icon and an active status for each widget service embedded in the smart card, to the remote server to request synchronization, and receiving real-time update information required according to execution of a specific widget service from the remote server to send the real-time update information to the smart card.

In another aspect of the present invention, there is provided a smart card including a terminal interworking module for forming an interface used to communicate with a user terminal and performing data communication for execution of a widget service through the interface, a widget operating module for setting status information including information about a service icon and an active status for at least one embedded widget service corresponding to specification of a user through the user terminal, making a widget waiting screen image including a service icon for a widget service set in an active status, and providing the widget waiting screen image to the user terminal through the interface, and a widget executing module having at least one widget service installed therein, calling and executing a widget service mapped with a specific service icon if the specific service icon is selected through the widget waiting screen image in the user terminal, and providing an execution screen image corresponding to the executed widget service.

In yet another aspect of the present invention, there is provided a method for providing a smart card-based widget service including setting, by a smart card, status information including information about a service icon and an active status for at least one embedded widget service corresponding to specification of a user through a user terminal, requesting by the user terminal initialization for a widget service through interface with the smart card, making by the smart card a widget waiting screen image, which includes a service icon for a widget service set in an active status, based on the status information according to the initialization request and providing the widget waiting screen image to the user terminal, requesting, by the user terminal, execution of a widget service corresponding to a specific service icon by selecting the specific service icon on the widget waiting screen image, executing by the smart card the widget service corresponding to the selected service icon as the execution of the widget service corresponding to the selected service icon is requested and providing an execution screen image for the executed widget service to the user terminal, and displaying by the user terminal the execution screen image received from the smart card.

In yet another aspect of the present invention, there is provided a method for providing a smart card-based widget service including requesting setting of status information including information about a service icon and an active status for at least one widget service embedded in a smart card through the interface with the smart card, requesting initialization for a widget service through the interface with the smart card, receiving a widget waiting screen image including a service icon for active-status widget services, which is made based on the set status information, requesting execution of a widget service corresponding to a specific service icon by selecting the specific service icon on the widget waiting screen image, and receiving an execution screen image for the widget service corresponding to the selected service icon from the smart card and displaying the execution screen image.

In yet another aspect of the present invention, there is provided a method for providing a smart card-based widget service including setting status information including information about a service icon and an active status for at least one embedded widget service according to a request of a user received through interface with a user terminal, making a widget waiting screen image, which includes a service icon for a widget service set in an active status, based on the status information in response to an initialization request received through the user terminal through the interface with the user terminal and providing the widget waiting screen image to the user terminal, calling a widget service mapped with a specific service icon in response to widget execution request of the user terminal through selection of the specific service icon on the widget waiting screen image, and executing the called widget service and providing an execution screen image for the executed widget service to the user terminal.

Advantageous Effect

As described above, according to the system and method for providing the smart card-based widget service and a smart card for the same of the present invention, a widget engine is mounted based on a service platform embedded in the smart card and driven so that various widget services can be provided. Accordingly, a widget service for a waiting screen image can be provided regardless of the type and the specification of a user terminal for the smart card. In addition, even if the user terminal is replaced with a new one, the information stored in the smart card is maintained, so that the continuity of the service can be ensured.

MODE OF INVENTION

Hereinafter, an exemplary embodiment of the present invention will be described with reference to accompanying drawings.

Figure 1:
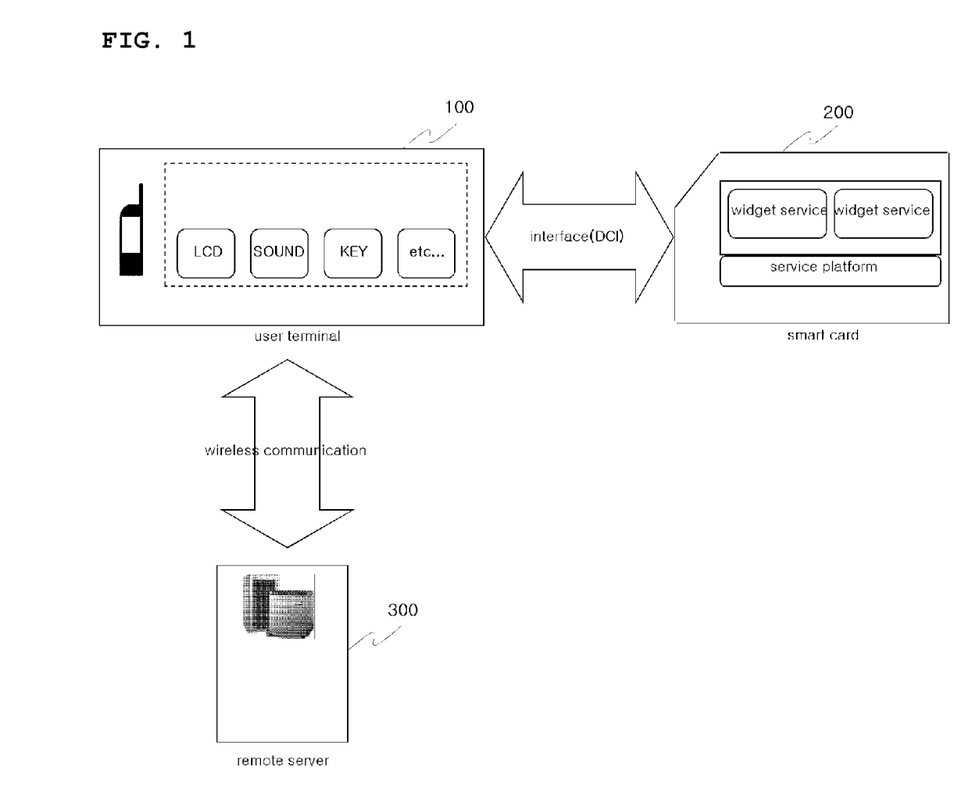
FIG. 1 is a schematic view showing a system for providing a smart card-based widget service according to an embodiment of the present invention.

FIG. 1 is a schematic view showing a system for providing a smart card-based widget service according to an embodiment of the present invention.

As shown in FIG. 1, the system for providing the smart card-based widget service includes a user terminal 100 to receive a widget service through an interface with a smart card 200, the smart card 200 to make a widget waiting screen image to provide the widget waiting screen image to the user terminal 100 and execute a specific widget service according to the request of the user terminal 100 through the widget waiting screen image, and a remote server 300 to selectively perform a synchronization process and provide real-time update information according to the request of the smart card 200. In this case, the smart card 200 is provided in the form of a USIM (Universal Subscriber Identity Module) having both of a SIM (Subscriber Identity Module) function of authenticating a subscriber and a UICC (Universal Integrated Circuit Card) function, thereby ensuring the integrity and the security of information data of all individuals by supporting the security of various multiple applications.

The user terminal 100 receives the widget waiting screen image, which includes a service icon for an active-status widget service from among at least one widget service embedded in the smart card 200. The user terminal 100 receives the widget waiting screen image from the smart card 200 through the interface with the smart card 200. The user terminal 100 also receives an execution screen image for a widget service corresponding to a specific service icon as the specific service icon is selected from the widget waiting screen image.

The smart card 200 sets status information including information about a service icon and an active status for at least one widget service according to the specification of a user through the user terminal 100. The smart card 200 also makes the widget waiting screen image including a service icon for an active-status widget service to provide the widget waiting screen image to the user terminal 100. In addition, the smart card 200 executes a widget service corresponding to a specific service icon as the specific service icon is selected in the user terminal 100 to provide the related execution screen image to the user terminal 100.

The remote server 300 receives the status information and performs a synchronization process according to the request of the smart card 200 through the user terminal 100. The remote server 300 provides real-time update information required as the specific widget service is executed.

Hereinafter, the system for providing the smart card-based widget service according to one embodiment of the present invention will be described in more detail.

The user terminal 100 forms an interface with the smart card 200 to communicate with the smart card 200. The user terminal 100 connects to the smart card 200 through the interface to receive the widget waiting screen image from the smart card 200. In more detail, the user terminal 100 forms the interface with the smart card 200, which is derived from a DCI (Device Control Interface) defined based on a USB (Universal Serial Bus). Accordingly, the user terminal 100 connects to the smart card 200 through the interface to receive the widget waiting screen image including a service icon for an active-status widget service among at least one widget service embedded in the smart card 200. Meanwhile, the user terminal 200 may set status information, which includes information about a service icon and an active status for at least one widget service embedded in the smart card 100, through the interface of the smart card 200 in relation to the widget waiting screen image. Therefore, the user terminal 200 receives the widget waiting screen image made based on the set status information and including a service icon for an active-status widget service.

In addition, the user terminal 100 selects a specific service icon displayed on the widget waiting screen image, receives the execution screen image of a related widget service from the smart card 200, and displays the execution screen image of the related widget service. In more detail, the user terminal 100 selects a specific service icon displayed on the widget waiting screen image, requests the execution of a related widget service to the smart card 200 through the interface, receives the execution screen image of the related widget service from the smart card 200 through the interface according to the request of the execution of the related widget service, and displays the execution screen image. In this case, the widget service is applicable to various services including a news service, a search service of bus location, a game service, a subway route map service, and a clock service according to the specification of the user.

Meanwhile, the user terminal 100 forms a connection path with the remote server 300 according to the request of the smart card 200 through the interface to perform an interworking process according to the execution of the widget service. In more detail, when setting the status information through the interworking process with the smart card 200, the user terminal 100 transmits the status information received therein from the smart card 200 to the remote server 300, thereby requesting the update for synchronization information, which has been previously stored in the remote server 300, so that the synchronization process can be performed. In addition, the user terminal 100 receives real-time update information, which is required from the smart card 200 according to the execution of a specific widget service when the user terminal 100 requests the execution of the specific widget service by selecting a specific service icon of the widget waiting screen image. The user terminal 100 receives real-time update information from the remote server 300 and sends the real-time update information to the smart card 200. The widget services requiring the real-time update information may include a news service, a weather service, and a search service of bus location.

The smart card 200 forms the interface with the user terminal 100 to communicate with the user terminal 100, so that data communication to execute a widget service can be made through the interface. In more detail, as described above, the smart card 200 forms the interface with the user terminal 100 which is derived from the DCI defined based on the USB.

In addition, the smart card 200 renders the widget waiting screen image according to the specification of the user through the user terminal 100. In more detail, the smart card 200 provides environments to execute a plurality of widget services embedded in the smart card 200 based on a card OS (Operation System) or a middleware installed based on the card OS, for example, a service platform such as a JAVA™ platform. In other words, the smart card 200 sets status information including information about a service icon, an active status, and a background image for at least one embedded widget service according to the specification of a user. In this case, the smart card 200 transmits the status information to the remote server 300 through the user terminal 100, so that the status information may be synchronized with status information which has been previously stored in the remote server 300. Accordingly, the smart card 200 makes the widget waiting screen image including service icons for widget services set in the active status based on the status information and sends the widget waiting screen image to the user terminal 100. In this case, when the smart card 200 makes the widget waiting screen image, the smart card 200 does not consider inactive-status widget services based on the status information. Further the smart card 200 renders the widget waiting screen image by taking into consideration active-status widget services, such as, "class path" (a widget service class file path used to initialize the instance of a widget), "x_axis" (X-axis coordinates of a widget service icon), "y_axis" (Y-axis coordinates of the widget service icon), a width (the width of the widget service icon), "height" (the height of the widget service icon), and "executable" (the executable status of the widget service).

In addition, the smart card 200 executes a widget service according to the request for the execution of the widget service received from the user terminal 100 and provides the execution screen image of the widget service to the user terminal 100 through the interface. In more detail, the smart card 200 calls a widget service mapped with a specific service icon among widget services installed in the smart card 200 as the user terminal 100 selects the specific service icon through the widget waiting screen image, and executes the widget service. Then, the smart card 200 provides the related execution screen image to the user terminal 100 through the interface. In this case, the smart card 200 is connected to the remote server 300 through the user terminal 100 to receive required real-time update information, such as information about a news service, a weather service, or a search service of bus location, according to the execution of the specific widget service.

Figure 2:
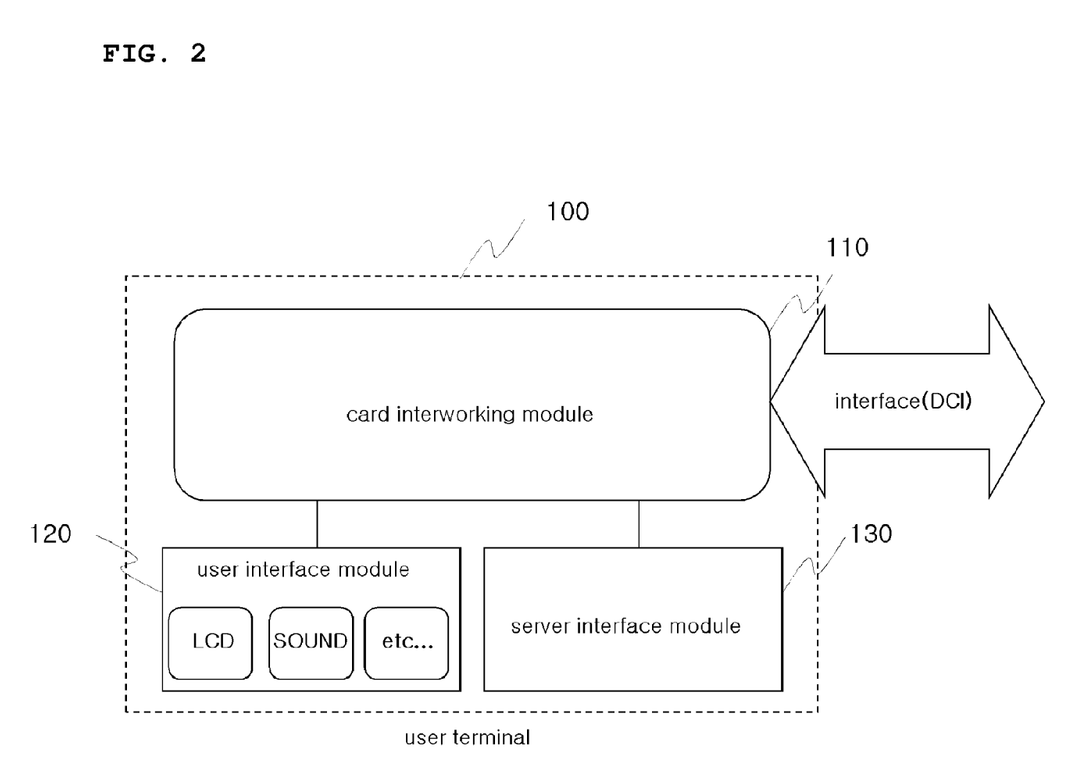
FIG. 2 is a schematic view showing a user terminal according to the embodiment of the present invention.

Hereinafter, the detailed structure of the user terminal 100 will be described with reference to FIG. 2. In other words, the user terminal 100 includes a card interworking module 110 to provide the connection path to the smart card 200, a user interface module 120 to receive and display the execution screen image of the widget service from the smart card 200, and a server interface module 130 to form the connection path with the remote server 300.

The card interworking module 110 forms an interface used to make communication with the smart card 200, and connects to the smart card 200 through the interface to receive the widget waiting screen image including a service icon for an active-status widget service among at least one widget service embedded in the smart card 200.

The user interface module 120 requests the execution of a widget service corresponding to a specific service icon of the widget waiting screen image to the smart card 200 through the interface if the specific service icon is selected from the widget waiting screen image sent from the card interworking module 110. Then, the user interface module 120 receives the execution screen image of the widget service from the smart card 200 through the interface according to the execution request and displays the execution screen image.

The server interface module 130 establishes a connection path with the remote server 300 in response to the request of the smart card 200 through the interface, and transmits status information including information about a service icon and an active status for each widget service embedded in the smart card 200 to the remote server 300 to require a synchronization process. The server interface module 130 receives the real-time update information, which is required according to the execution of the specific widget service, from the remote server 300 and sends the real-time update information to the smart card 200.

Hereinafter, the structure of the user terminal 100 will be described in more detail.

The card interworking module 110 forms an interface with the smart card 200 to communicate with the smart card 200. In more detail, the card interworking module 110 forms the interface with the smart card 200 which is derived from the DCI specification defined based on the USB standard. Therefore, the card interworking module 110 connects to the smart card 200 through the interface to receive the widget waiting screen image, which includes a service icon for an active-status widget service selected from at least one widget service embedded in the smart card 200 and sends the widget waiting screen image to the user interface module 120.

The user interface module 120 receives the execution screen image of a widget service corresponding to a specific service icon from the smart card 200 if the specific service icon is selected from the widget waiting screen image and displays the execution screen image of the widget service. In more detail, the user interface module 120 receives the widget waiting screen image from the card interworking module 110 to display the widget waiting screen image, and requests the execution of a widget service corresponding to a specific service icon to the smart card 200 through the interface as the user selects the specific service icon on the widget waiting screen image. According to the execution of the widget service, the user interface module 120 receives the execution screen image of the widget service from the smart card 200 through the interface and displays the execution screen image of the widget service. In this case, the widget service may be applicable to various services including a news service, a search service of bus location, a game service, a subway route map service, and a clock service according to the specification of the user.

The server interface module 130 establishes the connection path with the remote server 300 according to the request of the smart card 200 through the interface to perform an interworking process according to the execution of the widget service. In more detail, when the server interface module 130 sets status information by interworking with the smart card 200, the server interface module 130 transmits the status information received from the smart card 200 to the remote server 300 to request the update for the synchronization information, which has been previously stored in the remote server 300, so that the synchronization process can be performed. In addition, the server interface module 130 receives real-time update information, which is required from the smart card 200 according to the execution of a specific widget service as the execution of the specific widget service is requested by selecting a specific service icon on the widget waiting screen image, from the remote server 300 and sends the real-time update information to the smart card 200. The widget services requiring the real-time update information may include a news service, a weather service, and a search service of bus location.

Figure 3:
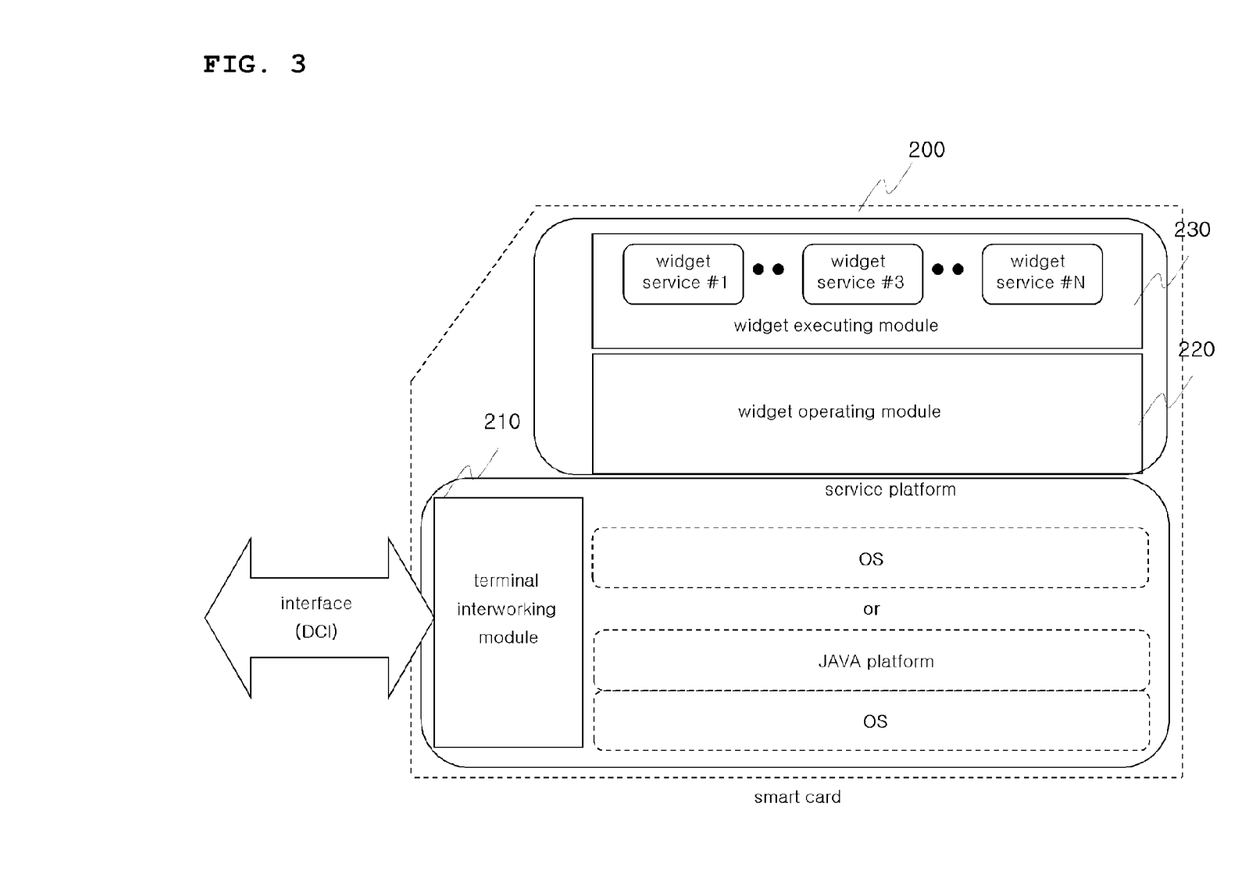
FIG. 3 is a schematic view showing a smart card according to the embodiment of the present invention.

Hereinafter, the structure of the smart card 200 will be described in detail with reference to FIG. 3. The smart card 200 includes a terminal interworking module 210 for forming an interface with the user terminal 100 to communicate with the user terminal 100, a widget operating module 220 for making a widget waiting screen image to provide the widget waiting screen image to the user terminal 200 through the interface, and a widget executing module 230 having a plurality of widget services installed therein and calling a specific widget service according to the request of the a user to execute the widget service.

The terminal interworking module 210 forms the interface with the user terminal 100 to communicate data for the purpose of the execution of the widget service through the interface.

The widget operating module 220 sets the status information including information about a service icon and an active status for at least one embedded widget service according to the specification of a user through the user terminal 10. The widget operating module 220 also makes the widget waiting screen image including a service icon for the widget service set in the active status, and provides the widget waiting screen image to the user terminal 100 through the interface.

In this case, according to one embodiment of the present invention, the widget operating module 220 transmits the status information to the remote server 300 through the user terminal 100 so that the status information can be synchronized with the status information that has been previously stored in the remote server 300.

In addition, according to one embodiment of the present invention, the widget operating module 220 receives a widget service, which is provided from the remote server 300 through the user terminal 100 in response to the request of the user terminal 100, and installs the widget service in the widget executing module 230.

In addition, according to one embodiment of the present invention, the widget operating module 220 can delete a specific widget service installed in the widget executing module 230 according to the request of the user terminal 100 through the interface.

The widget executing module 230, which has at least one widget service installed therein, calls a widget service mapped with a specific service icon among at least one widget service as the service icon is selected from the user terminal 100 through the widget waiting screen image. Widget executing module 230 executes the widget service, and provides an execution screen image corresponding to the widget service.

In this case, according to one embodiment of the present invention, the widget executing module 230 connects to the remote server 300 through the user terminal 100 to receive the required real-time update information according to the execution of a specific widget service.

Hereinafter, the structure of the smart card 200 will be described in more detail.

The terminal interworking module 210 forms an interface with the user terminal 100 to communicates with the user terminal 100. In more detail, the terminal interworking module 210 is installed on a card OS or a middleware installed based on the card OS, for example, a service platform such as a JAVA™ platform. As described above, the terminal interworking module 210 forms the interface with the user terminal 100 which is derived from the DCI based on the USB, and communicates data so that the widget service is executed through the interface.

In addition, the widget operating module 220 makes the widget waiting screen image according to the specification of a user through the user terminal 100. In more detail, the widget operating module 220 provides an environment to execute a plurality of embedded widget services based on the service platforms described above. The widget operating module 220 sets status information including information about a service icon, an active status, and a background image for at least one embedded widget service according to the specification of a user.

In this case, the widget operating module 220 transmits the status information to the remote server 300 through the user terminal 100 so that the status information can be synchronized with the status information which has been previously stored in the remote server 300. Accordingly, the widget operating module 220 makes the widget waiting screen image including service icons for widget services set in the active status based on the status information and provides the widget waiting screen image to the user terminal 100. In this case, when the widget operating module 220 makes the widget waiting screen image, the widget operating module 220 does not consider inactive-status widget services based on the status information. For instance, the widget operating module 220 makes the widget waiting screen image by taking into consideration activated widget services, especially, "class path" (a widget service class file path used to initialize the instance of a widget), "x_axis" (X-axis coordinates of a widget service icon), "y_axis" (Y-axis coordinates of the widget service icon), a width (the width of the widget service icon), "height" (the height of the widget service icon), and "executable" (the executable status of the widget service). In addition, the widget operating module 220 can receive a widget service, which is provided from the remote server 300 through the user terminal 100, according to the request of the user terminal 100 through the interface, and newly install the widget service in the widget executing module 230. In addition, the widget operating module 220 can support a function of removing a specific widget service installed in the widget executing module 230 according to the request of the user terminal 100 through the interface.

The widget executing module 230 executes a widget service according to the widget service execution request received from the user terminal 100 and provides the related execution screen image to the user terminal 100 through the interface. In more detail, the widget executing module 230 installs various widget services including a news service, a search service of bus location, a game service, a subway route map service, and a clock service according to the specification of the user. Accordingly, the widget executing module 230 calls a widget service mapped with a specific service icon among installed widget services as the user terminal 100 selects the specific service icon through the widget waiting screen image, executes the widget service, and provides a related execution screen image to the user terminal 100 through the interface. In this case, the widget executing module 230 connects to the remote server 300 through the user terminal 100 to receive real-time update information required according the execution of a specific widget service such as a news service, a weather service, or a search service of bus location, and provides the execution screen image including the update information to the user terminal 100 in real time.

As described above, according to the system for providing the smart card-based widget service of the present invention, a widget engine is mounted based on a service platform, for example, a JAVA™ platform, embedded in the smart card and driven so that various widget services can be provided. Accordingly, a widget service for a waiting screen image can be provided regardless of the type and the specification of the user terminal 100. In addition, even if the user terminal 100 is replaced with a new one, the information stored in the smart card 200 is maintained, so that the continuity of the service can be ensured.

Figure 5:
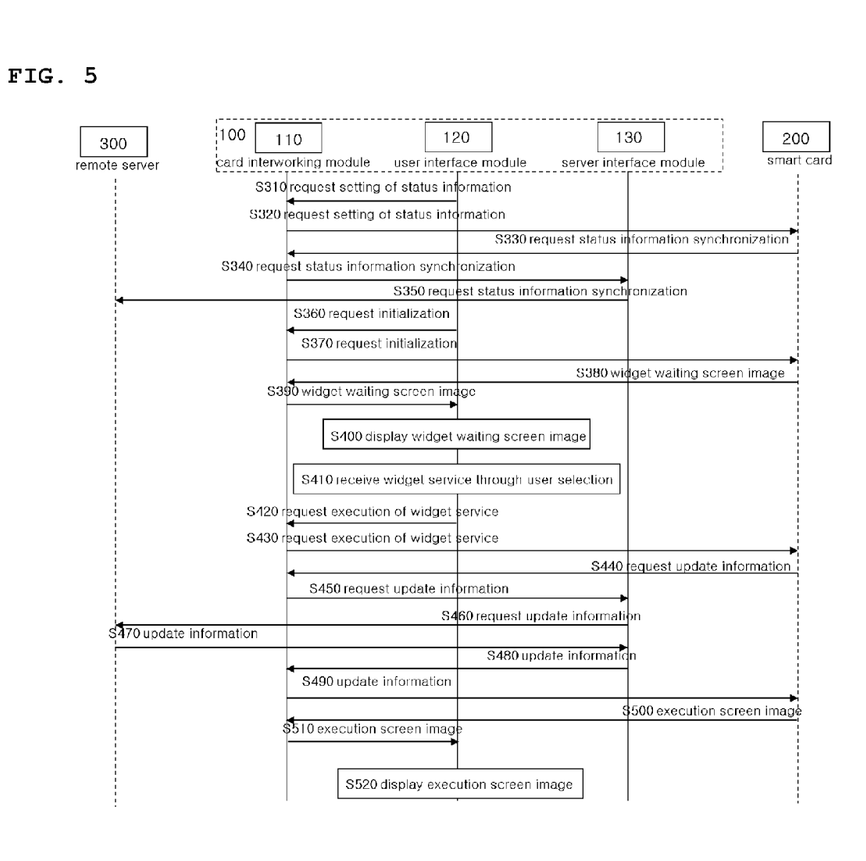
Figure 6:
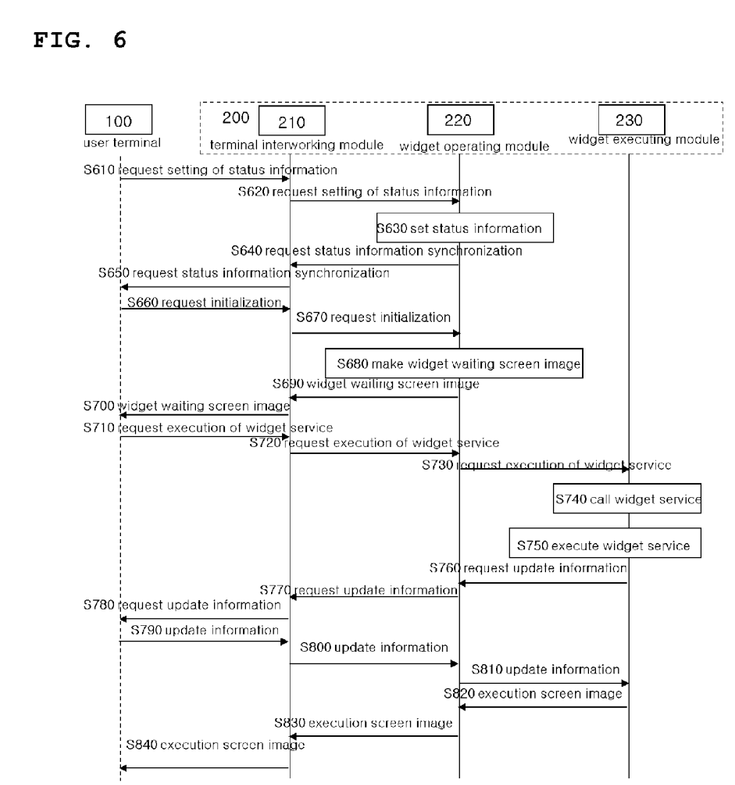

Hereinafter, the method for providing a widget service based on the smart card according to the embodiment of the present invention will be described with reference to FIGS. 4 to 6. In this case, for the purpose of explanation, the structures and the components shown in FIGS. 1 to 3 will be described with the related reference numbers.

Hereinafter, a method for driving the system for providing a smart card-based widget service according to the embodiment of the present invention will be described.

First, the overall procedure in the method for driving the system for providing a smart card-based widget service according to the embodiment of the present invention will be described.

The method for driving the system for providing the smart card-based widget service according to the embodiment of the present invention includes a status information setting step for setting by the smart card 200 status information including information about a service icon and an active status for at least one embedded widget service corresponding to the specification of a user through the user terminal 10, an initialization step for requesting by the user terminal 100 the initialization for a widget service through the interface with the smart card 200, a waiting screen image providing step for making by the smart card 200 a widget waiting screen image, which includes a service icon for a widget service set in an active status, based on the status information according to the initialization request and providing the widget waiting screen image to the user terminal 100, a widget service execution requesting step for requesting by the user terminal 100 the execution of a widget service corresponding to a specific service icon by selecting the specific service icon on the widget waiting screen image, a widget service executing step for executing by the smart card 200 the widget service corresponding to the selected service icon as the execution of the widget service corresponding to the selected service icon is requested and providing the execution screen image for the executed widget service to the user terminal 100, and a display step for displaying by the user terminal 100 the execution screen image received from the smart card 200.

Hereinafter, the method of driving the system for providing a smart card-based widget service according to one embodiment of the present invention will be described in more detail.

First, the smart card 200 sets status information including information about a service icon and an active status for at least one embedded widget service corresponding to the specification of a user through the user terminal 100 (step S110 to S150). Preferably, the smart card 200 sets status information including information about a service icon, an active status, and a background image for at least one embedded widget service corresponding to the specification of a user through the user terminal 10. In this case, the smart card 200 transmits the set status information to the remote server 300 through the user terminal 100 so that the status information can be synchronized with status information which has been previously stored in the remote server 300.

Then, the user terminal 100 requests the initialization for a widget service to the smart card 200 through the interface with the smart card 200 (step S160).

Next, the smart card 200 makes a widget waiting screen image, which includes a service icon for a widget service set in an active status based on the status information, according to the initialization request, and provides the widget waiting screen image to the user terminal 100 (steps S170 to S180). Preferably, the smart card 200 makes a widget waiting screen image, which includes a service icon for a widget service set in an active status, based on the status information and provides the widget waiting screen image to the user terminal 100. In this case, when the smart card 200 makes the widget waiting screen image, the smart card 200 does not consider inactive-status widget services based on the status information. Further the smart card 200 makes the widget waiting screen image by taking into consideration active-status widget services, especially, "class path" (a widget service class file path used to initialize the instance of a widget), "x_axis" (X-axis coordinates of a widget service icon), "y_axis" (Y-axis coordinates of the widget service icon), a width (the width of the widget service icon), "height" (the height of the widget service icon), and "executable" (the executable status of the widget service).

Subsequently, the user terminal 100 requests the execution of a widget service corresponding to a specific service icon by selecting the specific service icon on the widget waiting screen image (steps S190 to S210). Preferably, the user terminal 100 receives the widget waiting screen image from the smart card 200 and displays the widget waiting screen image. Then, as a user selects a specific service icon on the widget waiting screen image, the user terminal 100 requests the execution of the related widget service to the smart card 200 through the interface with the smart card 200.

Then, the smart card 200 executes the widget service corresponding to the specific service icon according to the execution request through the selection of the specific service icon and provides the execution screen image (steps S220 to S280). Preferably, the smart card 200 calls a widget service mapped with a specific service icon among widget services installed in the smart card 200 as the user terminal 100 selects the specific service icon through the widget waiting screen image and executes the widget service. Then, the smart card 200 provides a related execution screen image to the user terminal 100 through the interface with the user terminal 100. In this case, the widget executing module 230 connects to the remote server 300 through the user terminal 100 to receive real-time update information required according the execution of the specific widget service such as a news service, a weather service, or a search service of bus location, and provides the execution screen image including the update information to the user terminal 100 in real time.

Next, the user terminal 100 displays the execution screen image for the related widget service received from the smart card 200 (step S290).

Hereinafter, the method for providing a smart card-based widget service in the user terminal 100 according to one embodiment of the present invention will be described with reference to FIG. 5.

First, the overall procedure in the method for providing a smart card-based widget service in the user terminal 100 according to one embodiment of the present invention will be described below.

The method for providing a smart card-based widget service in the user terminal 100 according to one embodiment of the present invention includes a status information setting step for requesting the setting of status information including information about a service icon and an active status for at least one widget service embedded in the smart card 200 through the interface with the smart card 200, an initialization step for requesting the initialization for a widget service through the interface with the smart card 200, a waiting screen image receiving step for receiving a widget waiting screen image including service icons for active-status widget services, which is made based on the set status information, a widget service execution requesting step for requesting the execution of a widget service corresponding to a specific service icon by selecting the specific service icon on the widget waiting screen image, and a display step for receiving the execution screen image for the widget service corresponding to the selected service icon from the smart card 200 and displaying the execution screen image.

In this case, according to one embodiment of the present invention, in the a status information setting step, the status information received in the user terminal 100 from the smart card 200 is transmitted to the remote server 300 and the synchronization is requested to the remote server 300.

In addition, according to one embodiment of the present invention, in the widget service execution requesting step, the user terminal 100 receives the real-time update information according to a specific widget service, which is required from the smart card 200, from the remote server 300 and transmits the real-time update information to the smart card 200.

Hereinafter, the method for providing the smart card-based widget service in the user terminal 100 according to one embodiment of the present invention will be described in more detail.

Figure 4:
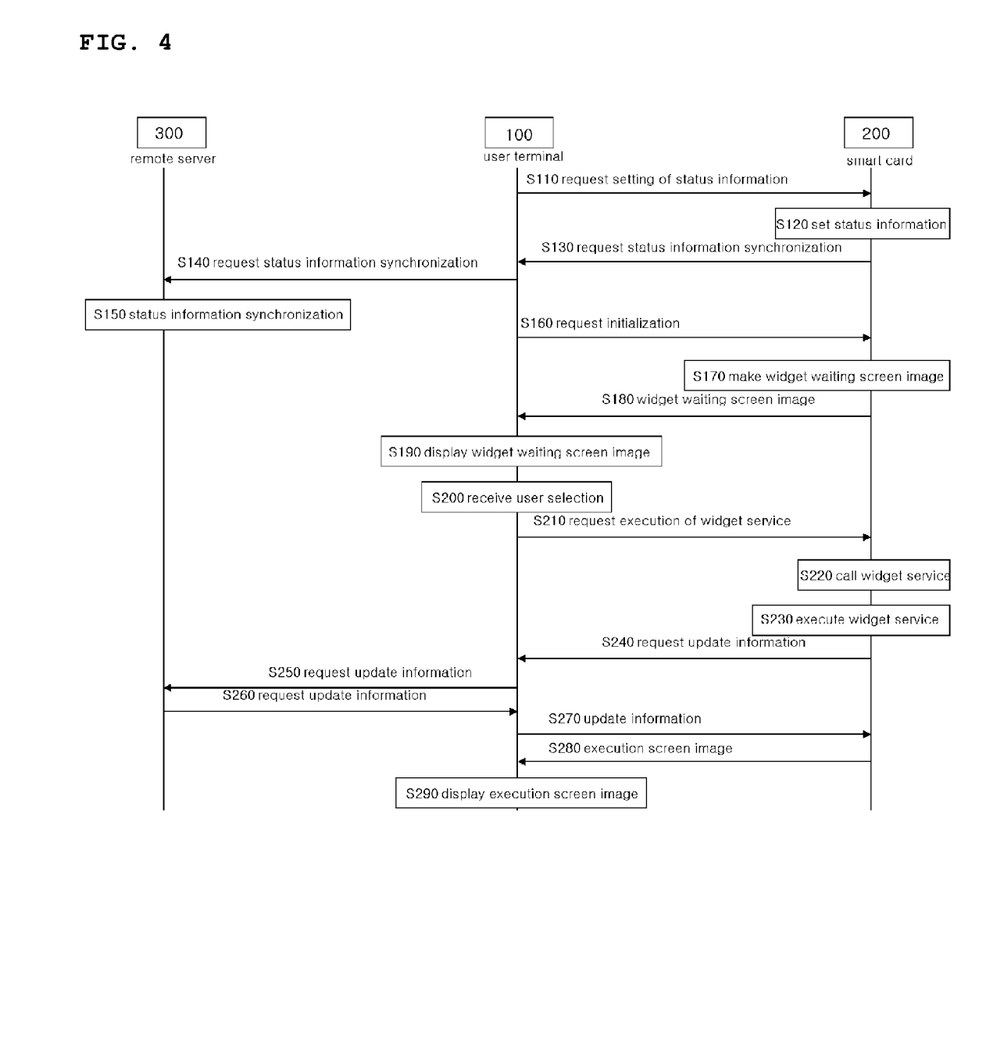
FIGS. 4 to 6 are flowcharts schematically showing a method for providing a smart card-based widget service according to the embodiment of the present invention.

First, the user terminal 100 requests the setting of the status information for widget services embedded in the smart card 200 (steps S310 to S350 corresponding to steps S110 to S150 of FIG. 4). Preferably, the user interface module 120 requests the setting of the status information including information about a service icon and an active status for at least one widget service embedded in the smart card 200 through the interface with the smart card 200 which is provided by the card interworking module 110. In this case, when setting the status information through the interworking with the smart card 200, the server interface module 130 transmits the status information received from the smart card 200 to the remote server 300 and requests the update of the synchronization information previously stored in the remote server 300 so that the synchronization operation can be performed.

Then, the user terminal 100 requests the execution of initialization for a widget service to the smart card 200 through the interface with the smart card 200 (steps S360 to S370 corresponding to step S160 of FIG. 4). Preferably, the user interface module 120 requests the execution of initialization for a widget service to the smart card 200 through the interface with the smart card 200 which is provided by the card interworking module 110 (step S160).

Then, the user terminal 100 receives the widget waiting screen image including service icons for the active-status widget services, which is made based on the status information, according to the request for the execution of the initialization (step S380 and S390 corresponding to steps S170 and S180 of FIG. 4). Preferably, the card interworking module 110 receives the widget waiting screen image including service icons for an active-status widget service among at least one widget service from the smart card 200 according to the request for the execution of the initialization. The card interworking module 110 then transfers the widget waiting screen image to the user interface module 120.

Subsequently, the user terminal 100 selects a specific service icon on the widget waiting screen image and requests the execution of a widget service related to the specific service icon (steps S400 to S430 corresponding to steps S190 to S210 of FIG. 4). Preferably, the user interface module 120 displays the widget waiting screen image after receiving the widget waiting screen image from the card interworking module 110. Then, the user interface module 120 requests the execution of a widget service related to a specific service icon to the smart card 200 through the interface with the smart card 200 as a user selects the specific service icon on the widget waiting screen image.

Thereafter, the user terminal 100 receives an execution screen image for the widget service corresponding to the specific service icon from the smart card 200 according to the execution request of the widget service and displays the execution screen image (steps S440 to S520 corresponding to steps S220 to S290 of FIG. 4). Preferably, the user interface module 120 receives an execution screen image for the widget service from the smart card 200 through the interface with the smart card 200 according to the execution request of the widget service, and displays the execution screen image. In addition, the server interface module 130 receives the real-time update information according to a specific widget service, which has been required from the smart card 200 as the execution of the specific widget service has been requested through the selection of a specific service icon on the widget waiting screen image. The server interface module 130 receives the real-time update information from the remote server 300 and sends the real-time update information to the smart card 200, so that the execution screen image of the widget service having the update information can be received.

Hereinafter, the method for providing a smart card-based widget service in the smart card 200 according to one embodiment of the present invention will be described with reference to FIG. 6.

First, the overall procedure in the method for providing the smart card-based widget service in the smart card 200 according to one embodiment of the present invention will be described.

The method for providing the smart card-based widget service in the smart card 200 according to one embodiment of the present invention includes a status information setting step for setting status information, including information about a service icon and an active status for at least one embedded widget service according to the request of a user received through the interface with the user terminal 100. The method also includes a waiting screen image providing step for making a widget waiting screen image, which includes a service icon for a widget service set in an active status, based on the status information in response to the initialization request received through the user terminal 100 through the interface with the user terminal 100 and providing the widget waiting screen image to the user terminal 100. Additionally, the method includes a widget service calling step for calling a widget service mapped with a specific service icon corresponding to the widget execution request of the user terminal 100 through the selection of the specific service icon on the widget waiting screen image. The method also includes a widget service executing step for executing the called widget service and providing the execution screen image for the executed widget service to the user terminal 100.

According to one embodiment of the present invention, in the status information setting step, the status information is transmitted to the remote server 300 through the user terminal 100 so that the status information can be synchronized with the status information that has been previously stored in the remote server 300.

According to one embodiment of the present invention, in the widget service executing step, the smart card 200 connects to the remote server 300 through the user terminal 100 to receive the real-time update information required according to the execution of the called widget service.

Hereinafter, the method for providing the smart card-based widget service in the smart card 200 according to one embodiment of the present invention will be described in more detail.

The smart card 100 sets status information including information about a service icon and an active status for at least one embedded widget service according to the request of a user received through the interface with the user terminal 100 (step S610 to S650 corresponding to steps S110 to S150). Preferably, the widget operating module 220 sets the status information including information about a service icon, an active status, and a background image for at least one embedded widget service according to the specification of a user through the user terminal 100. In this case, the widget operating module 220 transmits the status information to the remote server 300 through the user terminal 100 so that the status information can be synchronized with status information that has been previously stored in the remote server 300.

Then, the smart card 100 makes the widget waiting screen image, which includes a service icon for a widget service set in an active status, based on the status information according to the initialization request received from the user terminal 200 through the interface with the user terminal 200 and provides the widget waiting screen image to the user terminal 200 (steps S660 to S700 corresponding to steps S160 to S180 of FIG. 4). Preferably, the widget operating module 220 makes the widget waiting screen image, which includes a service icon for a widget service set in an active status, based on the status information according to the initialization request received from the terminal interworking module 210 and provides the widget waiting screen image to the user terminal 200. In this case, when the widget operating module 220 makes the widget waiting screen image, the widget operating module 220 does not consider inactive-status widget services based on the status information. For instance, the widget operating module 220 makes the widget waiting screen image by taking into consideration activated widget services, especially, "class path" (a widget service class file path used to initialize the instance of a widget), "x_axis" (X-axis coordinates of a widget service icon), "y_axis" (Y-axis coordinates of the widget service icon), a width (the width of the widget service icon), "height" (the height of the widget service icon), and "executable" (the executable status of the widget service).

Then, the smart card 100 calls a widget service mapped with a specific service icon according to the widget execution request of the user terminal 100 (steps S710 to S740 corresponding to steps S210 to S220 of FIG. 4). Preferably, the widget executing module 230 calls a widget service mapped with a specific service icon among installed widget services as the user terminal 100 selects the specific service icon through the widget waiting screen image.

Thereafter, the smart card 100 executes the called widget service and provides the execution screen image to the user terminal 200 (steps S750 to S840 corresponding to steps S230 to S280 of FIG. 4). Preferably, the widget executing module 230 executes the called widget service and provides the execution screen image to the user terminal 100 through the interface with the user terminal 100. In this case, the widget executing module 230 connects to the remote server 300 through the user terminal 100 to receive real-time update information required according the execution of a specific widget service such as a news service, a weather service, or a search service of bus location, and provides the execution screen image including the update information to the user terminal 100 in real time.

As described above, according to the method for providing the smart card-based widget service of the present invention, a widget engine is mounted based on a service platform, for example, a java platform, embedded in the smart card and driven so that various widget services can be provided. Accordingly, a widget service for a waiting screen image can be provided regardless of the type and the specification of the user terminal 100. In addition, even if the user terminal 100 is replaced with new one, the information stored in the smart card 200 is maintained, so that the continuity of the service can be ensured.

The method and steps of the algorithm described above related to the embodiments of the present invention may be realized in the form of hardware, software executed by a processor, or combination of hardware and software. The software module may reside in a storage medium, such as a random access memory (RAM), a flash memory, a read only memory (ROM), an erasable programmable read only memory (EPROM), an electrically erasable programmable read only memory (EEPROM), registers, a hard disc, a mobile disc, a CD-ROM, or other storage devices. The storage medium is connected to the processor, so that the processor may read information from the storage medium or record the information onto the storage medium. Alternatively, the storage medium can be integrated in the processor. The processor and the storage medium may be included in an application specific IC (ASIC). The ASIC may be included in the terminal. Alternatively, the processor and the storage medium may serve as components of the terminal.

Although exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

The system and the method for providing the smart card-based widget service and the smart card for the same according to the embodiments of the present invention overcome, or are distinguished from, the conventional technology in that a widget engine is mounted based on a service platform embedded in the smart card so that widget services can be realized. Accordingly, the present invention can be sufficiently available on the related market and in business, and can be utilized in practice, so that the present invention has industrial applicability.

The invention claimed is:

1. A system for providing a smart card-based widget service, the system comprising:
   a user terminal;
   a remote server; and
   a smart card removably received in the user terminal, wherein
   the smart card is configured to
      set status information for a plurality of widget services embedded in the smart card according to specification of a user through the user terminal, the status information including information about service icons and active status for the corresponding widget services,
      generate the widget waiting screen image including the service icons for the widget services in the active status,
      provide the widget waiting screen image to the user terminal through an interface between the user terminal and the smart card,
      when a specific service icon on the widget waiting screen image is selected through the user terminal, execute the widget service corresponding to the selected specific service icon,
      generate an execution screen image corresponding to the executed widget service, and
      provide the execution screen image to the user terminal, wherein the remote server is configured to perform a synchronization process with the smart card, and provide real-time update information with the smart card according to the widget service corresponding to the selected specific service icon.

2. The system of claim 1, wherein
   the remote server is configured to receive the status information according to a request of the smart card through the user terminal.

3. A user terminal for providing a smart card-based widget service, the user terminal comprising:
   a card interworking module configured to
      form an interface,
      communicate with a smart card through the interface, and
      receive a widget waiting screen image from the smart card, wherein the widget waiting screen image includes service icons for widget services in active status among a plurality of widget services embedded in the smart card;
   a user interface module configured to
      request execution of a widget service corresponding to a specific service icon, wherein the specific service icon is selected from the widget waiting screen image received from the card interworking module,
      receive an execution screen image of the requested widget service from the smart card through the interface according to the execution of the requested widget service,
      display the execution screen image; and
   a server interface module configured to
      establish a connection path with a remote server according to a request of the smart card through the interface,
      transmit status information including information about service icons and active status for the corresponding widget services embedded in the smart card,
      send a request for synchronization to the remote server, and
      receive real-time update information according to execution of a specific widget service from the remote server to send the received real-time update information to the smart card.

4. A smart card for providing a smart card-based widget service, the smart card comprising:
   a terminal interworking module configured to form an interface to communicate with a user terminal;
   a widget operating module configured to
      set status information for a plurality of widget services embedded in the smart card according to specification of a user through the user terminal, the status information including information about service icons and active status for the corresponding widget services,
      generate a widget waiting screen image including the service icons for the widget services set in the active status, and
      provide the widget waiting screen image to the user terminal through the interface; and
   a widget executing module configured to
      have the plurality of widget services installed therein,
      when a specific service icon on the widget waiting screen image is selected through the user terminal, execute the widget service corresponding to the selected specific service icon,
      generate an execution screen image corresponding to the executed widget service, and
      provide the execution screen image to the user terminal, wherein the widget executing module is configured to connect to a remote server through the user terminal to receive real-time update information according to the widget service corresponding to the selected specific service icon.

5. The smart card of claim 4, wherein the widget operating module is configured to transmit the set status information to the remote server through the user terminal so that synchronization is performed with status information that has been previously stored in the remote server.

6. The smart card of claim 4, wherein the widget operating module is configured to receive a widget service provided from the remote server through the user terminal in response to a request of the user terminal to install the widget service on the widget executing module.

7. The smart card of claim 4, wherein the widget operating module is configured to delete a specific widget service from the widget executing module according to a request of the user terminal through the interface.

8. A method performed by a system for providing a smart card-based widget service, the method comprising:
    setting, by a smart card, status information for a plurality of widget services embedded in the smart card according to specification of a user through a user terminal, the status information including information about service icons and active status for the corresponding widget services;
    sending, by the user terminal, a request for initialization for the smart card-based widget service through an interface between the user terminal and the smart card;
    generating, by the smart card, a widget waiting screen image the service icons for the widget services in the active status, based on the status information according to the initialization request and providing the widget waiting screen image to the user terminal through the interface;
    sending, by the user terminal, a request for execution of a widget service corresponding to a specific service icon by selecting the specific service icon on the widget waiting screen image;
    executing, by the smart card, the widget service corresponding to the selected specific service icon in response to the request for the execution of the widget service, generating an execution screen image corresponding to the executed widget service, and providing the execution screen image to the user terminal; and
    displaying, by the user terminal, the execution screen image received from the smart card,
    wherein the executing, by the smart card, the widget service comprises:
        receiving, from a remote server, real-time update information according to the widget service corresponding to the selected specific service icon.

9. A method performed by a user terminal for providing a smart card-based widget service, the method comprising:
    requesting setting of status information including information about service icons and active status for a plurality of widget services embedded in a smart card through an interface with the smart card;
    requesting initialization for the smart card-based widget service through the interface with the smart card;
    receiving a widget waiting screen image including the service icons for widget services in the active status, wherein the widget waiting screen image is made based on the set status information;
    requesting execution of a widget service corresponding to a specific service icon selected from the widget waiting screen image; and
    receiving an execution screen image for the widget service corresponding to the selected specific service icon from the smart card and displaying the execution screen image,
    wherein the requesting the execution of the widget service comprises:
        receiving, from a remote server, real-time update information according to the widget service corresponding to the selected specific service icon, and
        sending the real-time update information to the smart card.

10. The method of claim 9, wherein the requesting setting of the status information further comprises
    requesting synchronization by transmitting the set status information received from the smart card to the remote server.

11. A method performed by a smart card for providing a smart card-based widget service, the method comprising:
    setting status information for a plurality of widget services embedded in the smart card according to specification of a user through a user terminal, the status information including information about service icons and active status for the corresponding widget services;
    generating a widget waiting screen image including service icons for the widget services in the active status, based on the status information in response to an initialization request received through the user terminal through an interface between the user terminal and the smart card, and providing the widget waiting screen image to the user terminal through the interface;
    when a specific service icon on the widget waiting screen image is selected through the user terminal, executing the widget service corresponding to the selected specific service icon;
    generating an execution screen image corresponding to the executed widget service; and
    providing the execution screen image to the user terminal,
    wherein the executing of the widget service comprises
        receiving real-time update information according to the widget service corresponding to the selected specific service icon by connecting to a remote server through the user terminal.

12. The method of claim 11, wherein the setting of the status information comprises
    performing synchronization with status information that has been previously stored in the remote server by transmitting the set status information to the remote server through the user terminal.

13. A non-transitory computer-readable medium comprising commands for performing a method for providing a smart card-based widget service, the method comprising:
    requesting setting of status information including information about service icons and active status for a plurality of widget services embedded in a smart card through an interface with the smart card;
    requesting initialization for the smart card-based widget service through the interface with the smart card;
    receiving a widget waiting screen image including the service icons for widget services in the active status, wherein the widget waiting screen image is made based on the set status information;
    requesting execution of a widget service corresponding to a specific service icon selected from the widget waiting screen image; and receiving an execution screen image for the widget service corresponding to the selected specific service icon from the smart card and displaying the execution screen image, wherein the requesting the execution of the widget service comprises:

receiving, from a remote server, real-time update information according to the widget service corresponding to the selected specific service icon, and sending the real-time update information to the smart card.

14. A non-transitory computer-readable recording medium comprising computer readable code to control at least one processing device to implement a method for providing a smart card-based widget service, the method comprising:

setting status information for a plurality of widget services embedded in the smart card according to specification of a user through the user terminal, the status information including information about service icons and active status for the corresponding widget services;

generating a widget waiting screen image including service icons for the widget services in the active status, based on the status information in response to an initialization request received through the user terminal through an interface between the user terminal and the smart card, and providing the widget waiting screen image to the user terminal through the interface;

when a specific service icon on the widget waiting screen image is selected through the user terminal, executing the widget service corresponding to the selected specific service icon;

generating an execution screen image corresponding to the executed widget service; and providing the execution screen image to the user terminal, wherein the executing of the widget service comprises receiving real-time update information according to the widget service corresponding to the selected specific service icon by connecting to a remote server through the user terminal.

* * * * *